United States Patent
Sato et al.

(10) Patent No.: US 10,726,323 B2
(45) Date of Patent: Jul. 28, 2020

(54) SEMICONDUCTOR STORAGE DEVICE

(71) Applicant: TOSHIBA MEMORY CORPORATION, Minato-ku (JP)

(72) Inventors: Keisuke Sato, Yokohama (JP); Shigeto Endo, Yokohama (JP); Michio Ido, Yokohama (JP); Masaomi Teranishi, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 16/287,220

(22) Filed: Feb. 27, 2019

(65) Prior Publication Data

US 2019/0370625 A1    Dec. 5, 2019

(30) Foreign Application Priority Data

May 31, 2018 (JP) ................................ 2018-105255
Nov. 5, 2018 (JP) ................................ 2018-208406

(51) Int. Cl.
   *G06K 19/06*    (2006.01)
   *G06K 19/077*   (2006.01)
   *G06K 19/07*    (2006.01)

(52) U.S. Cl.
   CPC ... *G06K 19/07767* (2013.01); *G06K 19/0708* (2013.01); *G06K 19/07779* (2013.01)

(58) Field of Classification Search
   CPC .......... H01L 2924/00; G06K 19/07749; G06K 19/0723; G06K 19/077
   USPC ....................................................... 235/492
   See application file for complete search history.

(56) References Cited

U.S. PATENT DOCUMENTS

| 7,717,348 B2* | 5/2010 | Kawamura ........ G06K 19/0719 235/487 |
| 9,269,038 B2 | 2/2016 | Ikemoto et al. |
| 9,342,718 B2 | 5/2016 | Sato |
| 2002/0096568 A1* | 7/2002 | Arisawa ............. G06K 19/0701 235/492 |
| 2006/0138244 A1* | 6/2006 | Matsushita ........ G06K 19/0707 235/492 |
| 2008/0251586 A1 | 10/2008 | Kawamura et al. |
| 2013/0271326 A1 | 10/2013 | Shimasaki |
| 2015/0201459 A1 | 7/2015 | Sato |
| 2015/0254547 A1 | 9/2015 | Sato |

(Continued)

FOREIGN PATENT DOCUMENTS

| JP | 2013-222271 A | 10/2013 |
| JP | 2015-170355 A | 9/2015 |

(Continued)

*Primary Examiner* — Jamara A Franklin
(74) *Attorney, Agent, or Firm* — Oblon, McClelland, Maier & Neustadt, L.L.P.

(57) ABSTRACT

According to one embodiment, a semiconductor storage device includes a first loop antenna, a second loop antenna, and a controller. The first loop antenna generates a second magnetic field on the basis of electromagnetic induction according to a first magnetic field. The second loop antenna generates an induced electromotive force on the basis of electromagnetic induction according to the second magnetic field. The controller is operable on the basis of the induced electromotive force generated in the second loop antenna, and performs communication with respect to a first external device generating the first magnetic field, through the second loop antenna.

20 Claims, 9 Drawing Sheets

(56) References Cited

U.S. PATENT DOCUMENTS

2017/0099084 A1    4/2017   Endo et al.
2017/0277991 A1    9/2017   Fein

FOREIGN PATENT DOCUMENTS

| JP | 5835360 B2 | 12/2015 |
| JP | 5971734 B2 | 8/2016 |
| JP | 2017-68794 A | 4/2017 |
| JP | 2017-153060 A | 8/2017 |

\* cited by examiner

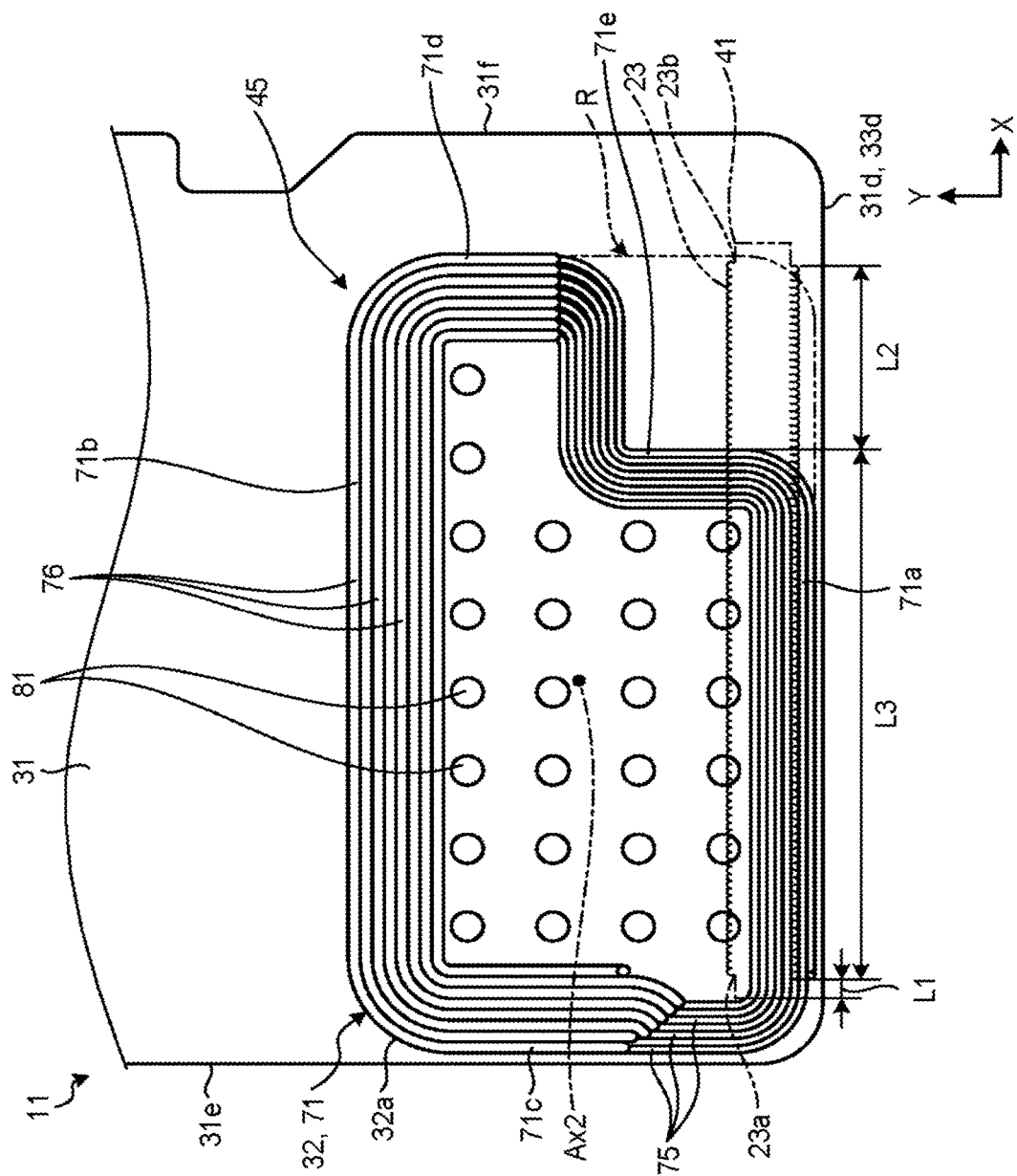

SEMICONDUCTOR STORAGE DEVICE

CROSS-REFERENCE TO RELATED APPLICATIONS

This application is based upon and claims the benefit of priority from Japanese Patent Application No. 2018-105255, filed on May 31, 2018; and Japanese Patent Application No. 2018-208406, filed on Nov. 5, 2018; the entire contents all of which are incorporated herein by reference.

FIELD

Embodiments described herein relate generally to a semiconductor storage device.

BACKGROUND

It is known that a device includes a loop antenna, and performs wireless communication with respect to an external device by using electromagnetic induction generated in the loop antenna on the basis of a magnetic field generated by the external device.

According to the arrangement of the loop antenna with respect to the external device, it may be difficult for a magnetic flux to pass through the inside of the loop antenna, and it may be difficult to perform the wireless communication.

BRIEF DESCRIPTION OF THE DRAWINGS

FIG. 9 is an exemplary plan view schematically illustrating a layer of a substrate, on which an intermediate antenna is provided, according to a sixth embodiment.

DETAILED DESCRIPTION

In general, according to one embodiment, a semiconductor storage device includes a first loop antenna, a second loop antenna, and a controller. The first loop antenna generates a second magnetic field on the basis of electromagnetic induction according to a first magnetic field. The second loop antenna generates an induced electromotive force on the basis of electromagnetic induction according to the second magnetic field. The controller is operable on the basis of the induced electromotive force generated in the second loop antenna, and performs communication with respect to a first external device generating the first magnetic field, through the second loop antenna.

First Embodiment

Hereinafter, a first embodiment will be described with reference to FIG. 1 to FIG. 4. Furthermore, herein, there is a case where constituents according to the embodiment, and the description thereof, are described in a plurality of expressions. The constituents and the descriptions thereof in the plurality of expressions, may be in other expressions not described. Further, constituents and the description thereof, not in the plurality of expressions, may be in other expressions not described.

Figure 1:
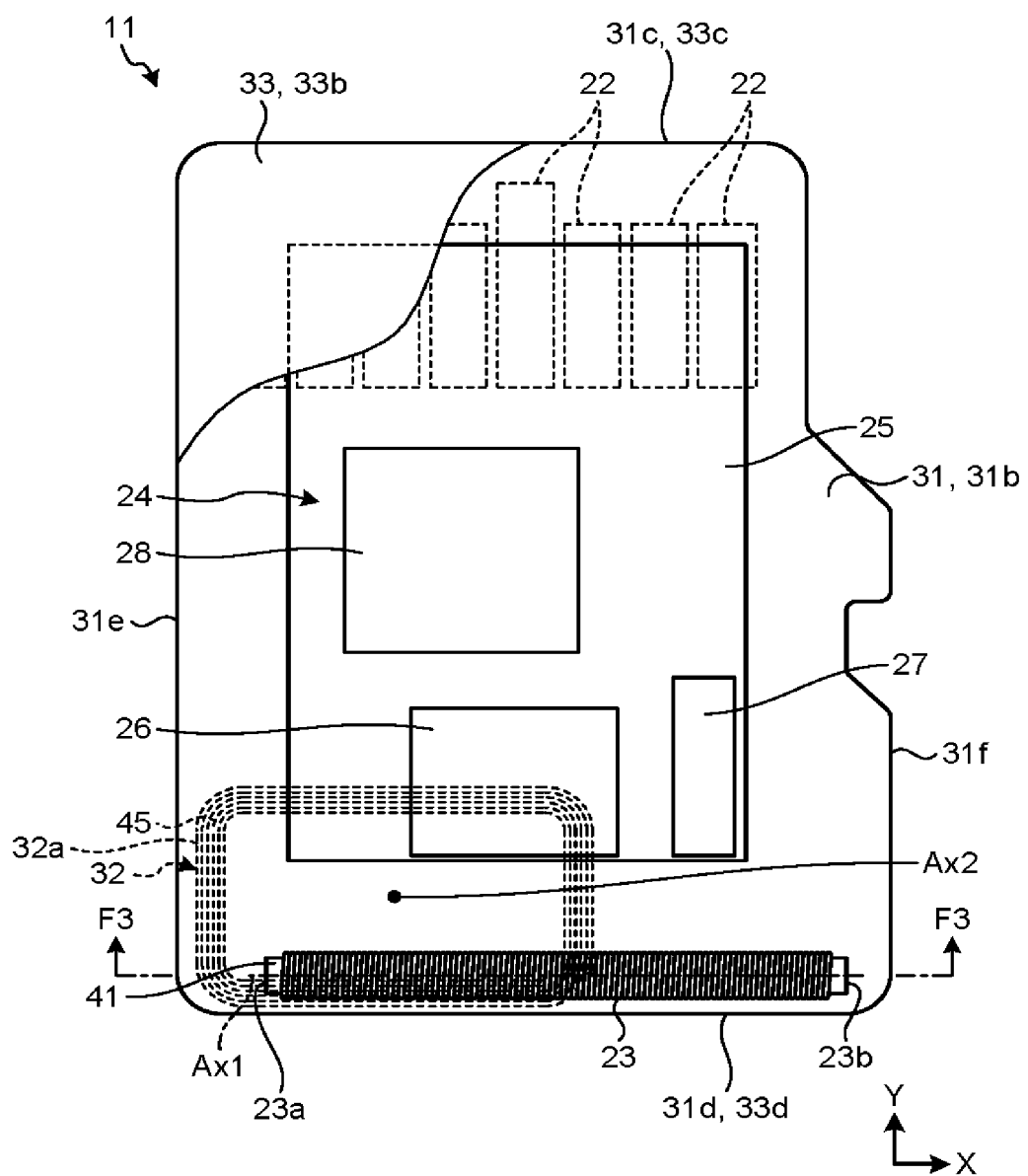
FIG. 1 is an exemplary plan view schematically illustrating a memory card according to a first embodiment.

FIG. 1 is an exemplary plan view schematically illustrating a memory card 11 according to a first embodiment. The memory card 11 is an example of a semiconductor storage device. In this embodiment, the memory card 11 is a micro SD card. Furthermore, the semiconductor storage device, for example, may be another device such as an SD card, a multimedia card, or a USB flash memory. The semiconductor storage device includes a device or a system including a semiconductor chip.

As illustrated in each of the drawings, herein, an X axis, a Y axis, and a Z axis are defined. The X axis, the Y axis, and the Z axis are orthogonal to each other. The X axis is defined along the width of the memory card 11. The Y axis is defined along the length of the memory card 11. The Z axis is defined along the thickness of the memory card 11.

A wireless communication technology is applied to the memory card 11 of this embodiment. For example, near field communication (NFC) using a frequency of 13.56 MHz, is applied to the memory card 11. Other wireless communication technologies may be applied to the memory card 11.

The memory card 11 to which the NFC is applied, induces a current with a wireless antenna, according to electromagnetic induction. For this reason, as described below, the memory card 11, for example, includes a wireless antenna formed into a shape that can be referred to as the shape of a coil, a helix, or a spiral.

Figure 2:
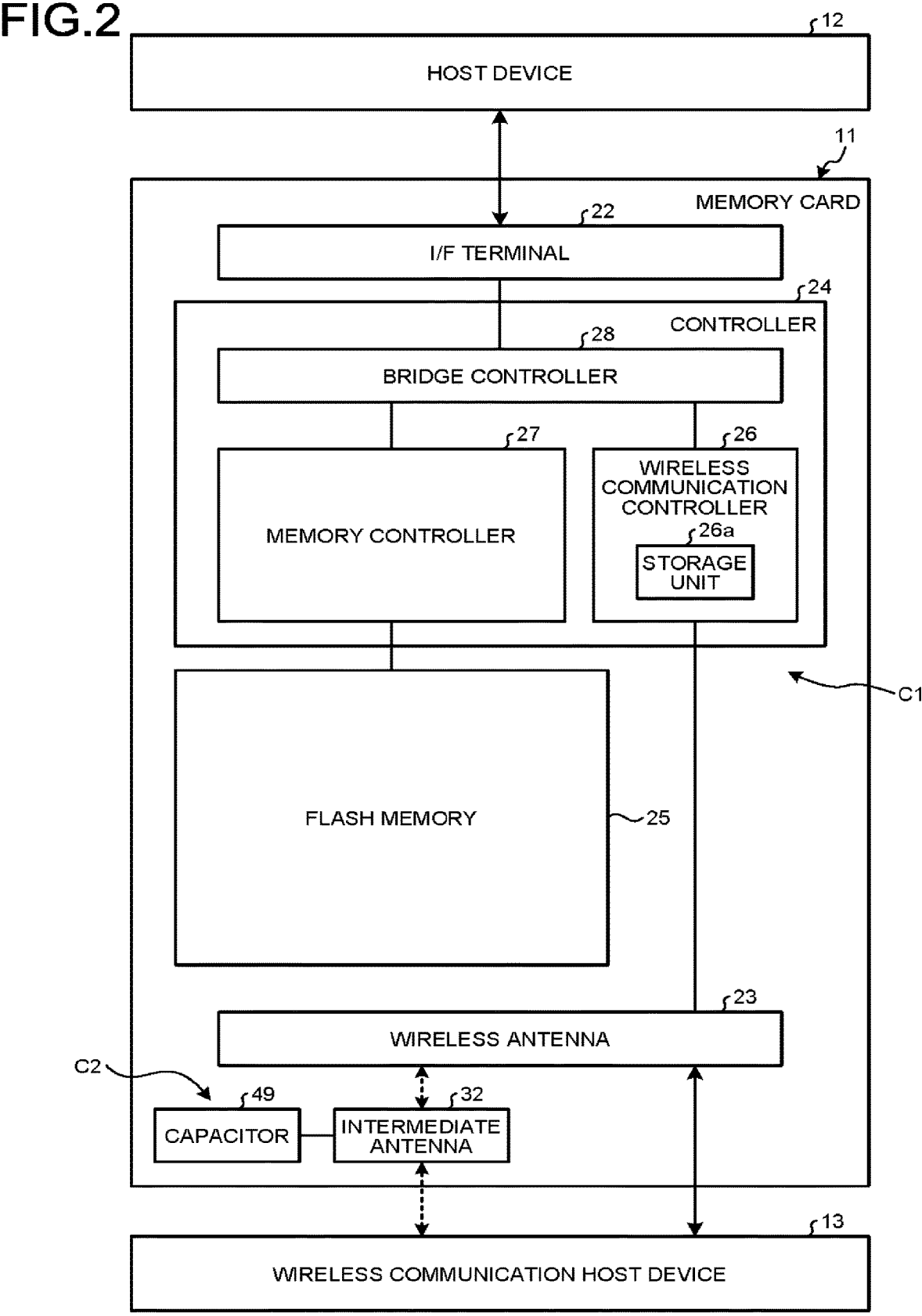
FIG. 2 is an exemplary block diagram schematically illustrating an example of a configuration of a system including the memory card in the first embodiment.

FIG. 2 is an exemplary block diagram schematically illustrating an example of a configuration of a system including the memory card 11 in the first embodiment. As illustrated in FIG. 2, the memory card 11 is configured to be electrically connected to a host device 12. The host device 12 is an example of a second external device. Further, the memory card 11 is configured to perform wireless communication with respect to a wireless communication host device 13. The wireless communication host device 13 is an example of a first external device. The host device 12 and the wireless communication host device 13, for example, are each a personal computer, a portable computer, a smart phone, a mobile phone, a server, a smart card, a reader/writer, or other devices.

The memory card 11 includes a plurality of interface (I/F) terminals 22, a wireless antenna 23, a controller 24, and a flash memory 25. Each of the I/F terminals 22 is an example of a terminal. The wireless antenna 23 is an example of a second loop antenna, and for example, can also be referred to as a coil or a secondary coil.

The controller 24 includes a wireless communication controller 26, a memory controller 27, and a bridge controller 28. In this embodiment, the wireless communication controller 26, the memory controller 27, and the bridge controller 28 are each a separate electronic component.

However, the wireless communication controller 26, the memory controller 27, and the bridge controller 28 may be included in the controller 24, as one electronic component. In addition, for example, a plurality of electronic components, wirings, and programs may configure each of the wireless communication controller 26, the memory controller 27, and the bridge controller 28. That is, the wireless communication controller 26, the memory controller 27, and the bridge controller 28 may be each configured of one electrical element, a plurality of electrical elements, or one or a plurality of electrical elements and a program.

The wireless communication controller 26 controls communication between the memory card 11 and the wireless communication host device 13. The wireless communication controller 26 includes a storage unit 26a. The memory controller 27 controls writing and reading of data with respect to the flash memory 25.

The bridge controller 28 controls the wireless communication controller 26 and the memory controller 27. Further, the bridge controller 28 controls communication between the memory card 11 and the host device 12.

In a case where the memory card 11 is electrically connected to the host device 12, the memory card 11 is operated by power to be supplied from the host device 12. For example, in the memory card 11, the data is written by the host device 12, or the data is read out by the host device 12.

The memory card 11 is capable of transmitting and receiving the data with respect to the wireless communication host device 13, in a state where the memory card 11 is not connected to an external device such as the host device 12, and power is not supplied from the external device. For example, the memory card 11 can use an induced electromotive force generated by the wireless antenna 23 on the basis of the electromagnetic induction to transmit and to receive the data with respect to the wireless communication host device 13. The memory card 11, for example, performs communication based on an NFC standard at a frequency of approximately 13.56 MHz to transmit and to receive the data with respect to the wireless communication host device 13. Thus, the memory card 11 is operable without receiving the supply of the power from the host device 12.

The memory card 11 of this embodiment, transmits and receives the data with respect to the host device 12, according to an SD interface. The memory card 11 may transmit and receive the data with respect to the host device 12 by using the other interface. The memory card 11 transmits and receives the data with respect to the wireless communication host device 13, according to an NFC interface. The memory card 11 may transmit and receive the data with respect to the wireless communication host device 13 by using the other wireless communication interface. Furthermore, the host device 12 and the wireless communication host device 13 may be the same device.

Figure 3:
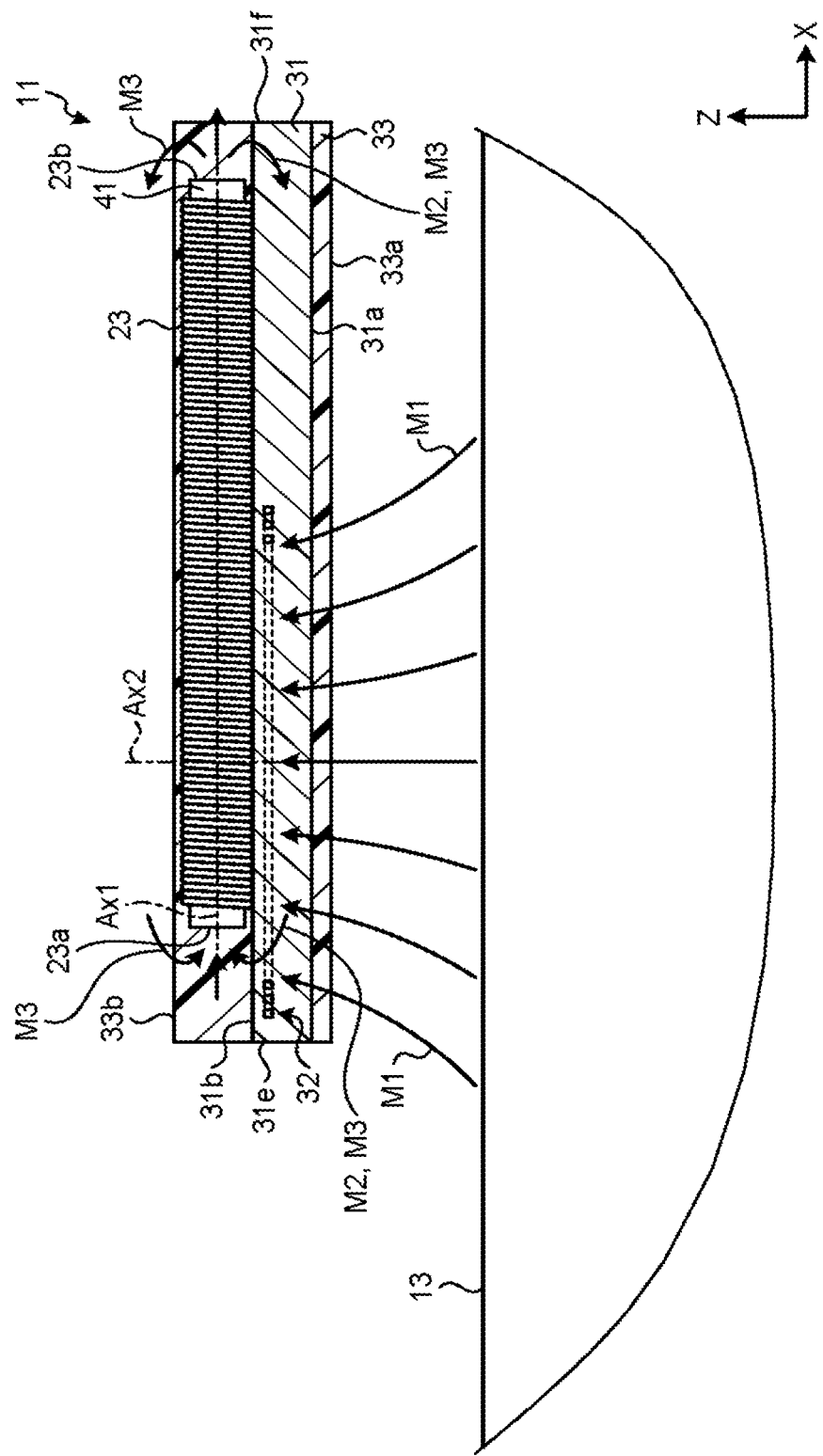
FIG. 3 is an exemplary sectional view schematically illustrating the memory card in the first embodiment, along line F3-F3 of FIG. 1.

FIG. 3 is an exemplary sectional view schematically illustrating the memory card 11 in the first embodiment, along line F3-F3 of FIG. 1. As illustrated in FIG. 3, the memory card 11 further includes a substrate 31, an intermediate antenna 32, and a cover 33. The intermediate antenna 32 is an example of a first loop antenna, and for example, can also be referred to as a coil or a boost coil.

The substrate 31, for example, is a printed circuit board (PCB). In this embodiment, the substrate 31, for example, includes a plurality of layers. Furthermore, the substrate 31 is not limited to such an example. The substrate 31 includes a first surface 31a and a second surface 31b.

The first surface 31a is an approximately flat surface oriented in a negative direction of the Z axis (an opposite direction of an arrow of the Z axis). The second surface 31b is positioned on a side opposite to the first surface 31a, and is an approximately flat surface oriented in a positive direction of the Z axis (a direction represented by the arrow of the Z axis).

As illustrated in FIG. 1, the memory card 11 and the substrate 31 are each formed approximately into the shape of a rectangle extending in a Y axis direction. The substrate 31 further includes a first edge 31c, a second edge 31d, a third edge 31e, and a fourth edge 31f.

The first edge 31c and the second edge 31d each extend in an X axis direction. The first edge 31c is separated with respect to the second edge 31d in a positive direction of the Y axis (a direction represented by an arrow of the Y axis). The third edge 31e extends in the Y axis direction. The fourth edge 31f extends approximately in the Y axis direction. The fourth edge 31f forms a cutout and a protrusion, for example.

The first edge 31c and the second edge 31d are each shorter than each of the third edge 31e and the fourth edge 31f. The first edge 31c and the second edge 31d form short sides of the substrate 31 approximately in the shape of a rectangle. The third edge 31e and the fourth edge 31f form long sides of the substrate 31 approximately in the shape of a rectangle.

The substrate 31 is provided with plurality of I/F terminals 22 and the intermediate antenna 32. The plurality of I/F terminals 22 are provided on the first surface 31a, are adjacent to the first edge 31c, and are arranged along the first edge 31c. The I/F terminal 22 of this embodiment is an SD interface terminal, and ensures electrical connection with respect to the host device 12. In other words, the I/F terminal 22 can be electrically connected to the host device 12.

The wireless antenna 23, the controller 24, and the flash memory 25 are mounted on the substrate 31. The flash memory 25 is arranged on the second surface 31b. The wireless communication controller 26, the memory controller 27, and the bridge controller 28 are arranged on the flash memory 25, and for example, are electrically connected to a pad on the second surface 31b by wire bonding. Furthermore, the mounting manner of the wireless communication controller 26, the memory controller 27, and the bridge controller 28 is not limited to such an example.

The cover 33, for example, is a so-called mold resin made of a synthetic resin that is a non-magnetic body and an insulating body. The cover 33 may be made of other materials. The cover 33 covers the first surface 31a and the second surface 31b of the substrate 31, the wireless antenna 23, the controller 24, and the flash memory 25, and forms the outer surface of the memory card 11.

As illustrated in FIG. 3, the cover 33 is also formed approximately into the shape of a rectangle extending in the Y axis direction, as with the memory card 11 and the substrate 31. The cover 33 includes a first outer surface 33a, a second outer surface 33b, a first edge 33c, and a second edge 33d. The first outer surface 33a is an example of an outer surface. The first outer surface 33a and the second outer surface 33b are each exposed to the outside of the memory card 11, and are a part of the outer surface of the memory card 11.

The first outer surface 33a is an approximately flat surface oriented in the negative direction of the Z axis. The second outer surface 33b is positioned on a side opposite to the first outer surface 33a, and is an approximately flat surface oriented in the positive direction of the Z axis. The first edge 33c and the second edge 33d form short sides of the cover 33 approximately in the shape of a rectangle, and each extend in the X axis direction. The first edge 33c is separated with respect to the second edge 33d in the positive direction of the Y axis. The first edge 33c and the second edge 33d of the cover 33 overlap with the first edge 31c and the second edge 31d of the substrate 31. Furthermore, the first edge 33c and the second edge 33d are not limited to such an example.

The plurality of I/F terminals 22 are not covered with the cover 33, and are exposed on the first outer surface 33a. The plurality of I/F terminals 22 are adjacent to the first edge 33c of the cover 33, and are arranged along the first edge 33c. In addition, for example, an image representing the capacity of the memory card 11, is printed on the second outer surface 33b.

In this embodiment, the wireless antenna 23 is a loop antenna including a coil that is wound into the shape of a helix, and extends in the X axis direction. The wireless antenna 23 is wound around a magnetic body 41. The magnetic body 41 is formed approximately into the shape of a rectangular parallelepiped extending in the X axis direction. Furthermore, the magnetic body 41 may be formed into the other shape such as a cylindrical shape. In addition, the magnetic body 41 may be omitted.

A center Ax1 of the helix-like wireless antenna 23, extends in the X axis direction. The length of the wireless antenna 23 in the X axis direction, is longer than the length of the wireless antenna 23 in the Y axis direction, and is also longer than the length of the wireless antenna 23 in a Z axis direction. Furthermore, the dimension of the wireless antenna 23 is not limited to such an example. The direction in which the center Ax1 extends and a direction along a magnetic flux having the largest magnitude of a magnetic field generated by the wireless antenna 23 are substantially the same. The direction in which the center Ax1 extends and a direction in which an opening end (23a or 23b) of the wireless antenna 23 faces are substantially the same also. The opening end (23a or 23b) is an end of the wireless antenna 23 in a direction along a magnetic flux generated by the wireless antenna 23 therein. In addition, a direction in which the center Ax1 of the wireless antenna 23 extends, may be locally changed.

The wireless antenna 23 is a so-called chip antenna, and is attached to the second surface 31b of the substrate 31, by surface mounting. As illustrated in FIG. 1, the wireless antenna 23 is adjacent to the second edge 31d of the substrate 31 and the second edge 33d of the cover 33, and extends along the second edges 31d and 33d. The wireless antenna 23 is separated from the plurality of I/F terminals 22 in a negative direction of the Y axis (an opposite direction of the arrow of the Y axis).

As illustrated in FIG. 2, the wireless antenna 23 is electrically connected to the wireless communication controller 26. The wireless antenna 23 supplies the induced electromotive force to the wireless communication controller 26, on the basis of the electromagnetic induction generated by a magnetic flux passing through the inside of the wireless antenna 23. Thus, the wireless antenna 23 performs communication with respect to the external device on the basis of the electromagnetic induction.

As illustrated in FIG. 1, in this embodiment, the intermediate antenna 32 is formed by a conductor pattern 45 provided on one layer of the substrate 31. The conductor pattern 45 is made of a conductor such as copper, and for example, forms a pad, wiring, a via, and a ground plane, in/on the substrate 31. Furthermore, the intermediate antenna 32 may be made of other materials such as a wire.

The intermediate antenna 32 is a loop antenna formed of the spiral conductor pattern 45. The intermediate antenna 32 is formed approximately into the shape of a rectangular ring. Furthermore, the intermediate antenna 32 may be formed into other shapes such as the shape of a circular ring.

As illustrated in FIG. 3, the intermediate antenna 32 is provided on an intermediate layer of the substrate 31, and is positioned between the first surface 31a and the second surface 31b. For this reason, the intermediate antenna 32 is positioned between the wireless antenna 23 and the first outer surface 33a. The intermediate antenna 32, for example, is separated from the wireless antenna 23 through an insulating layer of the substrate 31.

As illustrated in FIG. 1, the intermediate antenna 32 is adjacent to the second edge 31d and the third edge 31e. A part of the intermediate antenna 32 overlaps with a part of the wireless antenna 23 in the Z axis direction. The position of the intermediate antenna 32 and the wireless antenna 23 is not limited to such an example.

A center Ax2 of the spiral intermediate antenna 32, extends in the Z axis direction. The direction (the X axis direction), in which the center Ax1 of the wireless antenna 23 extends, intersects with a direction (the Z axis direction), in which the center Ax2 of the intermediate antenna 32 extends. In other words, the direction in which the center Ax1 of the wireless antenna 23 extends and the direction in which the center Ax2 of the intermediate antenna 32 extends are not parallel to each other. In this embodiment, the direction in which the center Ax1 of the wireless antenna 23 extends, and the direction in which the center Ax2 of the intermediate antenna 32 extends, are orthogonal to each other, and may intersect with each other at an angle less than 90°. The direction in which the center Ax2 extends and a direction along a magnetic flux having the largest magnitude of a magnetic field generated by the intermediate antenna 32 are substantially the same. The direction in which the center Ax2 extends and a direction in which an opening end of the intermediate antenna 32 faces are substantially the same also. The opening end is an end of the intermediate antenna 32 in a direction along a magnetic flux generated by the intermediate antenna 32 therein.

A cross section on the inside of the intermediate antenna 32, orthogonal to the direction (the Z axis direction) in which the center Ax2 extends, is larger than a cross section on the inside of the wireless antenna 23, orthogonal to the direction (the X axis direction) in which the center Ax1 extends. In other words, the cross section on the inside of the intermediate antenna 32 in an X-Y plane, is larger than the cross section on the inside of the wireless antenna 23 in a Y-Z plane. The cross section on the inside of the intermediate antenna 32, is a region surrounded by the spiral conductor pattern 45. The cross section on the inside of the wireless antenna 23, is a region surrounded by the helix-like wireless antenna 23.

As with FIG. 1, the wireless antenna 23 intersects with the intermediate antenna 32, in the plan view seen in the Z axis direction. In addition, one end portion 23a of the wireless antenna 23 in the X axis direction, is positioned on the inside of an outer edge 32a of the intermediate antenna 32, in the plan view seen in the Z axis direction. The end portion 23a is an example of a first end portion. The outer edge 32a is formed of the outermost wire of the wireless antenna 23, wound into the shape of a spiral.

The other end portion 23b of the wireless antenna 23 in the X axis direction, is positioned on the outside of the outer edge 32a of the intermediate antenna 32. The end portion 23b is an example of a second end portion, and is positioned on a side opposite to the end portion 23a. Both of two end portions 23a and 23b of the wireless antenna 23 may be positioned on the outside of the outer edge 32a of the intermediate antenna 32.

The one end portion 23a of the wireless antenna 23 is closer to the third edge 31e than the fourth edge 31f of the substrate 31. The other end portion 23b of the wireless antenna 23 is closer to the fourth edge 31f than the third edge 31e. In the X axis direction, a distance between the one end portion 23a of the wireless antenna 23 and the third edge 31e, is longer than a distance between the other end portion 23b and the fourth edge 31f.

As illustrated in FIG. 2, the intermediate antenna 32 is electrically separated from a circuit C1 including the I/F terminal 22, the wireless antenna 23, the controller 24, and the flash memory 25. In other words, the intermediate antenna 32 is electrically independent from the wireless antenna 23.

Terminals of the intermediate antenna 32 are connected to a capacitor 49. Accordingly, the intermediate antenna 32 forms a resonance circuit C2 independent from the circuit C1. Furthermore, the intermediate antenna 32 is not limited to such an example. For example, the conductor pattern 45 that forms the intermediate antenna 32 or is connected to the intermediate antenna 32, may be provided on the plurality of layers of the substrate 31 to make electrostatic capacitance between the conductor patterns 45 of the adjacent layers. Not only the capacitor 49, but also such electrostatic capacitance made by the conductor pattern 45 or other electrostatic capacitances, are capable of forming the resonance circuit C2, along with the intermediate antenna 32.

A magnetic flux passes through the inside of the intermediate antenna 32, and thus, the electromagnetic induction is generated in the intermediate antenna 32, and a current flows into the intermediate antenna 32. The current flows into the intermediate antenna 32, and thus, the intermediate antenna 32 generates A magnetic flux that passes through the inside of the intermediate antenna 32.

In the memory card 11 of this embodiment to which the NFC is applied, a resonance frequency of the intermediate antenna 32 is set to be greater than or equal to 10 MHz and less than or equal to 20 MHz. For example, the resonance frequency of the intermediate antenna 32 is set to approximately 13.56 MHz. The resonance frequency of the intermediate antenna 32, for example, is adjusted by the capacitor 49.

In the memory card 11 described above, the wireless antenna 23 of FIG. 2 receives an electrical wave transmitted from the wireless communication host device 13 to generate a current or a voltage, on the basis of the electromagnetic induction. The wireless antenna 23 supplies the generated power to the wireless communication controller 26.

The wireless antenna 23 of this embodiment is set corresponding to a predetermined frequency or a predetermined frequency band corresponding to the NFC. For example, a resonance frequency of the wireless antenna 23 is set to approximately 13.56 MHz.

The wireless antenna 23 transmits the data received from the wireless communication host device 13, to the wireless communication controller 26. Further, the wireless antenna 23 transmits the data received from the wireless communication controller 26, to the wireless communication host device 13.

The wireless communication controller 26 is capable of communicating with the wireless communication host device 13 through the wireless antenna 23. The wireless communication controller 26 controls the NFC using the wireless antenna 23 with respect to the wireless communication host device 13.

The wireless communication controller 26 is operable by the power generated in the wireless antenna 23 on the basis of the electromagnetic induction described above. The wireless communication controller 26 receives a signal or data represented by the current or the voltage generated in the wireless antenna 23 on the basis of the electrical wave from the wireless communication host device 13, and is operated according to the signal or the data. For example, the wireless communication controller 26 receives the data at a predetermined frequency corresponding to the NFC from the wireless communication host device 13 through the wireless antenna 23, and writes the data in the storage unit 26a, while being operated. In addition, the wireless communication controller 26 reads out the data written in the storage unit 26a, and transmits the data to the wireless communication host device 13 through the wireless antenna 23, while being operated. More specifically, in a case where a signal at a predetermined frequency corresponding to the NFC is received through the wireless antenna 23, the wireless communication controller 26 is capable of performing communication according to the NFC.

The bridge controller 28 is capable of communicating with the host device 12 through the I/F terminal 22. When the data is written in the flash memory 25, the bridge controller 28 transmits the data received from the host device 12 through the I/F terminal 22, to the memory controller 27. When the data is read out from the flash memory 25, the bridge controller 28 transmits the data received from the memory controller 27, to the host device 12 through the I/F terminal 22.

For example, in a case where the memory card 11 is electrically connected to the host device 12, sufficient power is supplied to the wireless communication controller 26. In this case, the wireless communication controller 26 may write the data received from the wireless communication host device 13 through the wireless antenna 23, according to the NFC, in the flash memory 25 through the bridge controller 28 and the memory controller 27.

In a case where sufficient power is supplied to the wireless communication controller 26, the wireless communication controller 26 may read out the data written in the flash memory 25, through the bridge controller 28 and the memory controller 27, may generate the data, and may write the data in the storage unit 26a.

In a case where sufficient power is supplied to the wireless communication controller 26, the wireless communication controller 26 may read out a part or all of the data written in the flash memory 25, through the bridge controller 28 and the memory controller 27, and may transmit the read data to the wireless communication host device 13 through the wireless antenna 23.

The storage unit 26a is a low power consumption memory that is operable by the power generated in the wireless antenna 23. The power consumption for writing or reading the data with respect to the storage unit 26a, is less than the power consumption for writing or reading the data with respect to the flash memory 25.

The storage unit 26a, for example, is a non-volatile memory. The storage unit 26a stores the data on the basis of the control by the wireless communication controller 26. Furthermore, the storage unit 26a may be a memory temporarily storing the data. The storage unit 26a, for example, is an electrically erasable programmable read-only memory (EEPROM). The storage unit 26a may be other memories.

As described above, the wireless communication controller 26 and the storage unit 26a are operable by power induced in the wireless antenna 23 according to the electrical wave from the wireless communication host device 13. However, in a case where power is supplied from the host device 12 to the memory card 11, the wireless communication controller 26 and the storage unit 26a may be operated by the power supplied from the host device 12.

The flash memory 25, for example, is an NAND type flash memory. Furthermore, the memory card 11 may include other non-volatile memories such as an NOR type flash memory, a magnetoresistive random access memory (MRAM), a phase change random access memory (PRAM), a resistive random access memory (ReRAM), or a ferroelectric random access memory (FeRAM), instead of the flash memory 25.

The memory controller 27 controls the writing and the reading of the data with respect to the flash memory 25. More specifically, in a case where a writing command and data are received from the host device 12 through the I/F terminal 22 and the bridge controller 28, the memory controller 27 writes the data in the flash memory 25. In a case where a reading command is received from the host device 12 through the I/F terminal 22 and the bridge controller 28, the memory controller 27 reads out the data from the flash memory 25, and transmits the data to the host device 12 through the bridge controller 28 and the I/F terminal 22.

For example, in a case where the memory card 11 is electrically connected to the host device 12, sufficient power is supplied to the memory controller 27. In this case, the memory controller 27 may write the data received from the wireless communication host device 13 through the wireless antenna 23, the wireless communication controller 26, and the bridge controller 28, in the flash memory 25. In a case where sufficient power is supplied to the memory controller 27, the memory controller 27 may transmit the data read out from the flash memory 25, to the wireless communication host device 13 through the bridge controller 28, the wireless communication controller 26, and the wireless antenna 23.

The flash memory 25 and the memory controller 27 are operated by the power supplied from the host device 12.

The data described above, for example, may be data to be transmitted and received between the wireless communication host device 13 and the memory card 11, according to the NFC interface, may be feature data of the data written in the flash memory 25, may be feature data received in the wireless communication controller 26 from the wireless communication host device 13 through the wireless antenna 23, may be feature data relevant to the flash memory 25, or may be feature data relevant to the memory card 11. More specifically, the data, for example, may be a part of the data (for example, the first data or the last data) in image data written in the flash memory 25, thumbnail data, management information of the data written in the flash memory 25, memory capacitance of the flash memory 25, the remaining capacitance of the flash memory 25, the name of a file written in the flash memory 25, a generating time of the data, photographing time data in a case where the data is image data, or the number of files written in the flash memory 25.

In this embodiment, first, a writing instruction and data from the host device 12, are received in the bridge controller 28, and after that, are received in the memory controller 27. This is because, first, the bridge controller 28 determines whether the writing instruction and the data are received from the host device 12 or from the wireless communication host device 13, and switches the operation according to a determination result thereof.

In this embodiment, for example, the memory card 11 and the wireless communication host device 13 transmit and receive data relevant to permission or prohibition of writing and reading of the data (hereinafter, referred to as data of a lock function) with respect to the flash memory 25. The data of the lock function is stored in the storage unit 26a. Furthermore, the memory card 11 and the storage unit 26a are not limited to such an example.

The wireless communication controller 26 writes the data of the lock function in the storage unit 26a, on the basis of the data received from the wireless communication host device 13. The bridge controller 28 refers to the data of the lock function stored in the storage unit 26a, at the time of receiving the data from the host device 12. In a case where the writing and reading of the data with respect to the flash memory 25 is prohibited, the bridge controller 28 does not transmit and receive the data with respect to the memory controller 27. In a case where the writing and reading of the data with respect to the flash memory 25 is permitted, the bridge controller 28 transmits and receives the data with respect to the memory controller 27, as described above.

Figure 4:
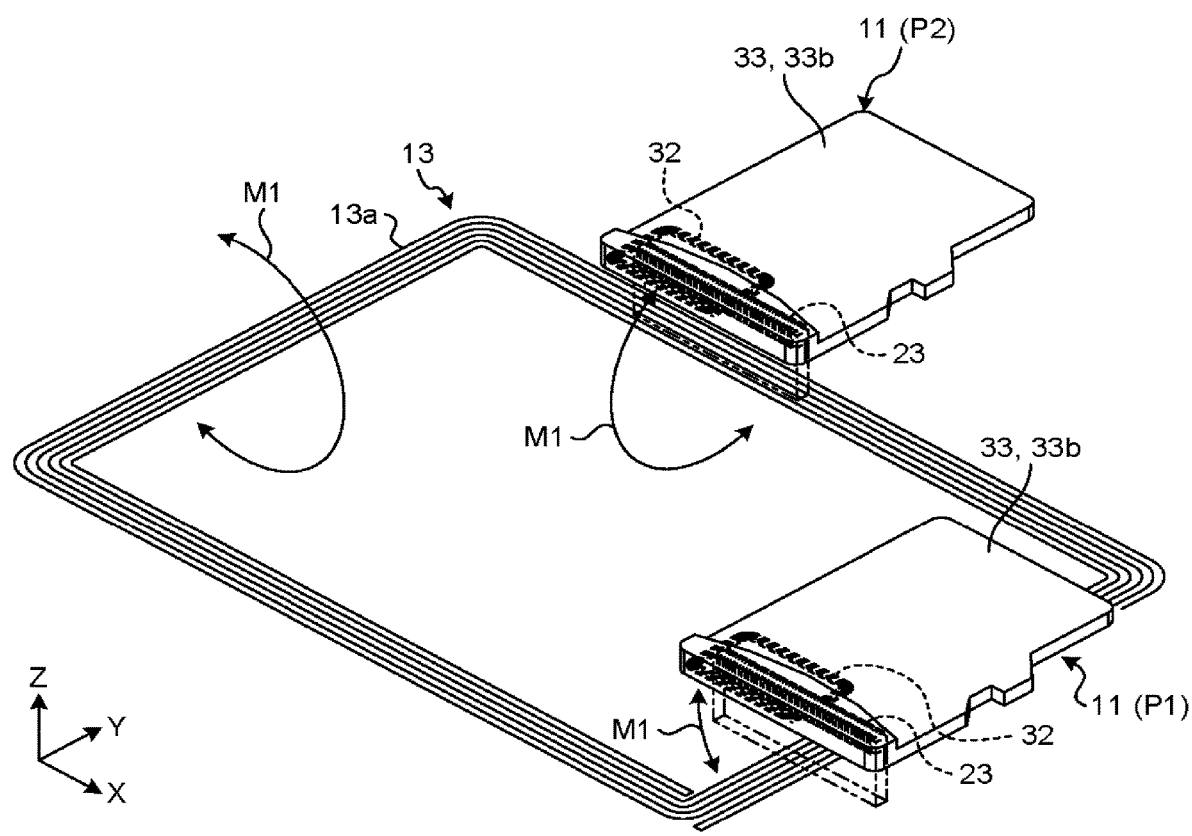
FIG. 4 is an exemplary perspective view schematically illustrating the memory card and a wireless communication host device in the first embodiment.

Hereinafter, the electromagnetic induction of the wireless antenna 23 will be described in detail. FIG. 4 is an exemplary perspective view schematically illustrating the memory card 11 and the wireless communication host device 13 in the first embodiment. As illustrated in FIG. 4, the wireless communication host device 13 includes an antenna 13a. The antenna 13a, for example, can also be referred to as a primary coil.

The antenna 13a, for example, is a spiral loop antenna. The antenna 13a is formed approximately into the shape of a rectangular ring. Furthermore, the antenna 13a may be formed into other shapes such as the shape of a circular ring. A cross section on the inside of the antenna 13a, is larger than the cross section on the inside of the intermediate antenna 32. Furthermore, the size of the antenna 13a is not limited to such an example.

The antenna 13a, for example, transmits an electrical wave, and thus, generates a first magnetic field M1 having a frequency of approximately 13.56 MHz. Furthermore, the antenna 13a of the wireless communication host device 13 may generate the first magnetic field M1 without the electrical wave. FIG. 4 and FIG. 3 schematically illustrate a magnetic flux of the first magnetic field M1 by an arrow. In general, the magnetic flux of the first magnetic field M1, passes through the inside of the antenna 13a, and approximately radially spreads from the antenna 13a.

For the wireless communication with respect to the wireless communication host device 13, the memory card 11 is arranged on the upper side of the antenna 13a, such that a direction in which the center of the antenna 13a extends, is approximately parallel to the direction in which the center Ax2 of the intermediate antenna 32 extends. For example, the memory card 11 is arranged in a first position 21 or a second position P2 of FIG. 4, with respect to the antenna 13a.

In the plan view seen in the Z axis direction, the wireless antenna 23 of the memory card 11 in the first position P1, intersects with the antenna 13a. In this case, the magnetic flux of the first magnetic field M1 can pass through the inside of the wireless antenna 23.

The wireless antenna 23 generates the induced electromotive force, on the basis of the electromagnetic induction according to the magnetic flux of the first magnetic field M1 passing through the inside of the wireless antenna 23. The wireless communication controller 26 is operated on the basis of the induced electromotive force generated in the wireless antenna 23, and communicates with the wireless communication host device 13 through the wireless antenna 23.

On the other hand, in the plan view seen in the Z axis direction, the wireless antenna 23 of the memory card 11 in the second position P2, extends in parallel with the antenna 13a. In this case, the center Ax1 of the wireless antenna 23 is orthogonal to the magnetic flux of the first magnetic field M1, and thus, it is difficult for the magnetic flux of the first magnetic field M1 to pass through the inside of the wireless antenna 23. Even in a case where the electromagnetic induction is generated in the wireless antenna 23 by the magnetic flux of the first magnetic field M1, the induced electromotive force may be insufficient for operating the wireless communication controller 26.

The wireless antenna 23 is wound long in the X axis direction. For this reason, the wireless antenna 23, for example, has directivity stronger than that of the intermediate antenna 32, and thus, it is difficult for the magnetic flux of the first magnetic field M1 to pass through the inside of the intermediate antenna 32. In addition, the wireless antenna 23 has a small proprietary area on the substrate 31.

As illustrated in FIG. 3, the magnetic flux of the first magnetic field M1 can pass through the inside of the intermediate antenna 32. The intermediate antenna 32 can collect the magnetic flux of the first magnetic field M1 according to a resonance. The electromagnetic induction is generated in the intermediate antenna 32 by the magnetic flux of the first magnetic field M1, passing through the inside of the intermediate antenna 32.

While a current flows into the intermediate antenna 32 on the basis of the electromagnetic induction, the intermediate antenna 32 generates a second magnetic field M2. FIG. 3 schematically illustrates a magnetic flux of the second magnetic field M2 by an arrow. The magnetic flux of the second magnetic field M2 passes through the inside of the intermediate antenna 32, and approximately radially spreads from the intermediate antenna 32.

In the plan view seen in the Z axis direction, the wireless antenna 23 intersects with the intermediate antenna 32. The magnetic flux of the second magnetic field M2 can pass through the inside of the wireless antenna 23. The wireless antenna 23 generates the induced electromotive force on the basis of the electromagnetic induction according to the magnetic flux of the second magnetic field M2, passing through the inside of the wireless antenna 23. That is, when the electromagnetic induction is generated in the intermediate antenna 32, the electromagnetic induction is generated in the wireless antenna 23. The wireless communication controller 26 is operated on the basis of the induced electromotive force generated in the wireless antenna 23, and communicates with the wireless communication host device 13 through the wireless antenna 23.

Further, the magnetic flux of the first magnetic field M1 passes through the inside of the intermediate antenna 32 according to a resonance, and changes the direction to radially spread from the intermediate antenna 32. The magnetic flux of the first magnetic field M1, of which the direction is changed, is can pass through the inside of the wireless antenna 23. For this reason, it is possible to increase a magnetic flux density in the wireless antenna 23, and to increase the induced electromotive force in the wireless antenna 23.

As described above, the wireless antenna 23 is capable of directly transmitting and receiving the electrical wave or the magnetic field with respect to the antenna 13a of the wireless communication host device 13, and is capable of indirectly transmitting and receiving the electrical wave or the magnetic field with respect to the antenna 13a via the intermediate antenna 32. That is, the memory card 11 is capable of performing communication with respect to the wireless communication host device 13, not only in a position where the electromagnetic induction is generated in the intermediate antenna 32, but also in a position where the electromagnetic induction is generated in the wireless antenna 23.

There is a case where the memory card 11, for example, performs communication with respect to the other wireless communication host device 13, in a state of being contained in a connector of the host device 12. In this case, the intermediate antenna 32 is covered with a metal housing of the host device 12 or the connector, and thus, it is difficult for the magnetic flux of the first magnetic field M1 to pass through the inside of the intermediate antenna 32. However, the wireless antenna 23 is positioned in the vicinity of an opening end of the connector. The magnetic flux of the first magnetic field M1 can pass through the inside of the wireless antenna 23, and the memory card 11 can perform the communication with respect to the wireless communication host device 13.

For example, in a case where the memory card 11 is electrically connected to the host device 12, and sufficient power is supplied to the wireless communication controller 26, the wireless communication controller 26 may function as a reader/writer. In this case, the wireless communication controller 26 supplies a current or a voltage representing a signal or data, to the wireless antenna 23. Accordingly, the wireless antenna 23, for example, transmits the electrical wave, and thus, generates a third magnetic field M3.

The intermediate antenna 32 generates the second magnetic field M2 on the basis of electromagnetic induction according to the third magnetic field M3. In a case where the electromagnetic induction is generated in the antenna 13a by the second magnetic field M2, the wireless communication host device 13 receives a signal or data represented by a current or a voltage generated in the antenna 13a, and is operated according to the signal or the data.

In the memory card 11 according to the first embodiment described above, the intermediate antenna 32 generates the second magnetic field M2 on the basis of the electromagnetic induction according to the first magnetic field M1. The wireless antenna 23 generates the induced electromotive force on the basis of the electromagnetic induction according to the second magnetic field M2. The wireless communication controller 26 of the controller 24 is operable on the basis of the induced electromotive force generated in the wireless antenna 23, and communicates with the wireless communication host device 13 through the wireless antenna 23. That is, the intermediate antenna 32 translates the first magnetic field M1 to the second magnetic field M2 suitable for the electromagnetic induction of the wireless antenna 23. In this embodiment, the intermediate antenna 32 performs translation between the first magnetic field M1 and the second magnetic field M2 of which directions are different from each other. Accordingly, it is possible to increase a communication range of the memory card 11, compared to a case where the intermediate antenna 32 is absent.

The second loop antenna is capable of generating the induced electromotive force on the basis of the electromagnetic induction according to the first magnetic field M1. That is, the wireless communication controller 26 is capable of communicating with the wireless communication host device 13 in both of a case where the magnetic flux of the first magnetic field M1 directly passes through the inside of the wireless antenna 23, and a case where the magnetic flux of the first magnetic field M1 passes through the inside of the intermediate antenna 32, and thus, the intermediate antenna 32 generates the second magnetic field M2, and the magnetic flux of the second magnetic field M2 passes through the inside of the wireless antenna 23. Accordingly, it is possible to increase the communication range of the memory card 11, compared to a case where the intermediate antenna 32 is absent.

As with the first position P1, in a case where the direction in which the center Ax1 of the wireless antenna 23 extends, extends in parallel with the wire of the antenna 13a, and the direction in which the center Ax1 of the wireless antenna 23 extends, is orthogonal to the direction of the magnetic flux of the first magnetic field M1, it is difficult for the magnetic flux to pass through the inside of the wireless antenna 23, and the electromagnetic induction is rarely generated in the wireless antenna 23. In this embodiment, the direction in which the center Ax2 of the intermediate antenna 32 extends, intersects with the direction in which the center Ax1 of the wireless antenna 23 extends. Accordingly, the magnetic flux of the first magnetic field M1 can pass through the inside of at least one of the intermediate antenna 32 and the wireless antenna 23, and generates the electromagnetic induction in at least one of the intermediate antenna 32 and the wireless antenna 23. Accordingly, the controller 24 is capable of more reliably communicating with the wireless communication host device 13, and thus, it is possible to increase the communication range of the memory card 11.

In the plan view seen in the direction in which the center Ax2 of the intermediate antenna 32 extends, the one end portion 23a of the wireless antenna 23 is positioned on the inside of the outer edge 32a of the intermediate antenna 32. Accordingly, the magnetic flux of the second magnetic field M2, passing through the inside of the intermediate antenna 32, easily enters the inside of the wireless antenna 23 from the one end portion 23a of the wireless antenna 23, and the electromagnetic induction is easily generated in the wireless antenna 23. In addition, the magnetic flux of the third magnetic field M3 generated by the wireless antenna 23, easily enters the inside of the intermediate antenna 32. Accordingly, the controller 24 is capable of more reliably communicating with the wireless communication host device 13, and thus, it is possible to increase the communication range of the memory card 11.

The cross section on the inside of the intermediate antenna 32, orthogonal to the direction in which the center Ax2 of the intermediate antenna 32 extends, is larger than the cross section on the inside of the wireless antenna 23, orthogonal to the direction in which the center Ax1 of the wireless antenna 23 extends. Accordingly, the magnetic flux of the first magnetic field M1 easily passes through the inside of the intermediate antenna 32, and the electromagnetic induction is easily generated in the intermediate antenna 32. Accordingly, the controller 24 is capable of more reliably communicating with the wireless communication host device 13, and thus, it is possible to increase the communication range of the memory card 11.

The intermediate antenna 32 and the wireless antenna 23 are electrically separated from each other. Accordingly, for example, even in a case where the intermediate antenna 32 is covered with a conductive body, the controller 24 is capable of communicating with the wireless communication host device 13, insofar as the magnetic flux of the first magnetic field M1 passes through the inside of the wireless antenna 23. Accordingly, a decrease in the communication range of the memory card 11 is suppressed.

The intermediate antenna 32 is positioned between the wireless antenna 23 and the first outer surface 33a on which the plurality of I/F terminals 22 are exposed. The memory card 11 that is the micro SD card, in general, is treated such that the first outer surface 33a on which the I/F terminal 22 is provided, is oriented in a direction separated from a user, such as a lower direction. For this reason, it is considered that the user treats the memory card 11 such that the first outer surface 33a faces the wireless communication host device 13. According to such treatment, the intermediate antenna 32 is arranged between the wireless antenna 23 and the wireless communication host device 13. The magnetic flux of the first magnetic field M1, generated by the wireless communication host device 13, for example, passes through the inside of the intermediate antenna 32, according to a resonance, and changes the direction to radially spread from the intermediate antenna 32. The magnetic flux of the first magnetic field M1, of which the direction is changed, and the magnetic flux of the second magnetic field M2, generated in the intermediate antenna 32, pass through the inside of the wireless antenna 23, and thus, the electromagnetic induction is generated in the wireless antenna 23, and the controller 24 is capable of communicating with the wireless communication host device 13. Thus, the intermediate antenna 32 changes the direction of the magnetic flux of the first magnetic field M1, and thus, it is possible to increase the magnetic flux density on the inside of the wireless antenna 23, and to more reliably generate the electromagnetic induction by the wireless antenna 23. Accordingly, the controller 24 is capable of more reliably communicating with the wireless communication host device 13, and thus, it is possible to increase the communication range of the memory card 11.

The conductor pattern 45 provided on the substrate 31, forms the intermediate antenna 32. Accordingly, it is possible to provide intermediate antenna 32 without increasing the number of components, and thus, an increase in the cost of the memory card 11 is suppressed.

The wireless antenna 23 is mounted on the substrate 31. Accordingly, for example, the wireless antenna 23 is easily arranged such that the direction in which the center Ax1 of the wireless antenna 23 extends, and the direction in which the center Ax2 of the intermediate antenna 32 extends, intersect with each other.

The resonance frequency of the intermediate antenna 32 is greater than or equal to 10 MHz and less than or equal to 20 MHz. The frequency of the magnetic field complied with the NFC standard, is 13.56 MHz. For this reason, the intermediate antenna 32 resonates to the first magnetic field M1 having a frequency complied with the NFC standard (13.56 MHz), and thus, easily collects the magnetic flux of the first magnetic field M1. Accordingly, the intermediate antenna 32 easily generates the second magnetic field M2 on the basis of the first magnetic field M1, and the controller 24 is capable of more reliably communicating with the wireless communication host device 13, and thus, it is possible to increase the communication range of the memory card 11.

In the plan view seen in the Z axis direction, a conductor such as a bonding pad, may exist on the inside of the intermediate antenna 32. Even in a case where the conductor exists, the magnetic flux of the first magnetic field M1 passes through the inside of the intermediate antenna 32, and thus, the electromagnetic induction is generated in the intermediate antenna 32.

Second Embodiment

Hereinafter, a second embodiment will be described with reference to FIG. 5. Furthermore, in the description of a plurality of embodiments described below, the same reference numerals as those of the constituents described above will be applied to constituents having the same functions as those of the constituents described above, and there is a case where the description thereof will be omitted. In addition, a plurality of constituents to which the same reference numerals are applied, are not necessarily common to all functions and properties, and may have different functions and properties according to each of the embodiments.

Figure 5:
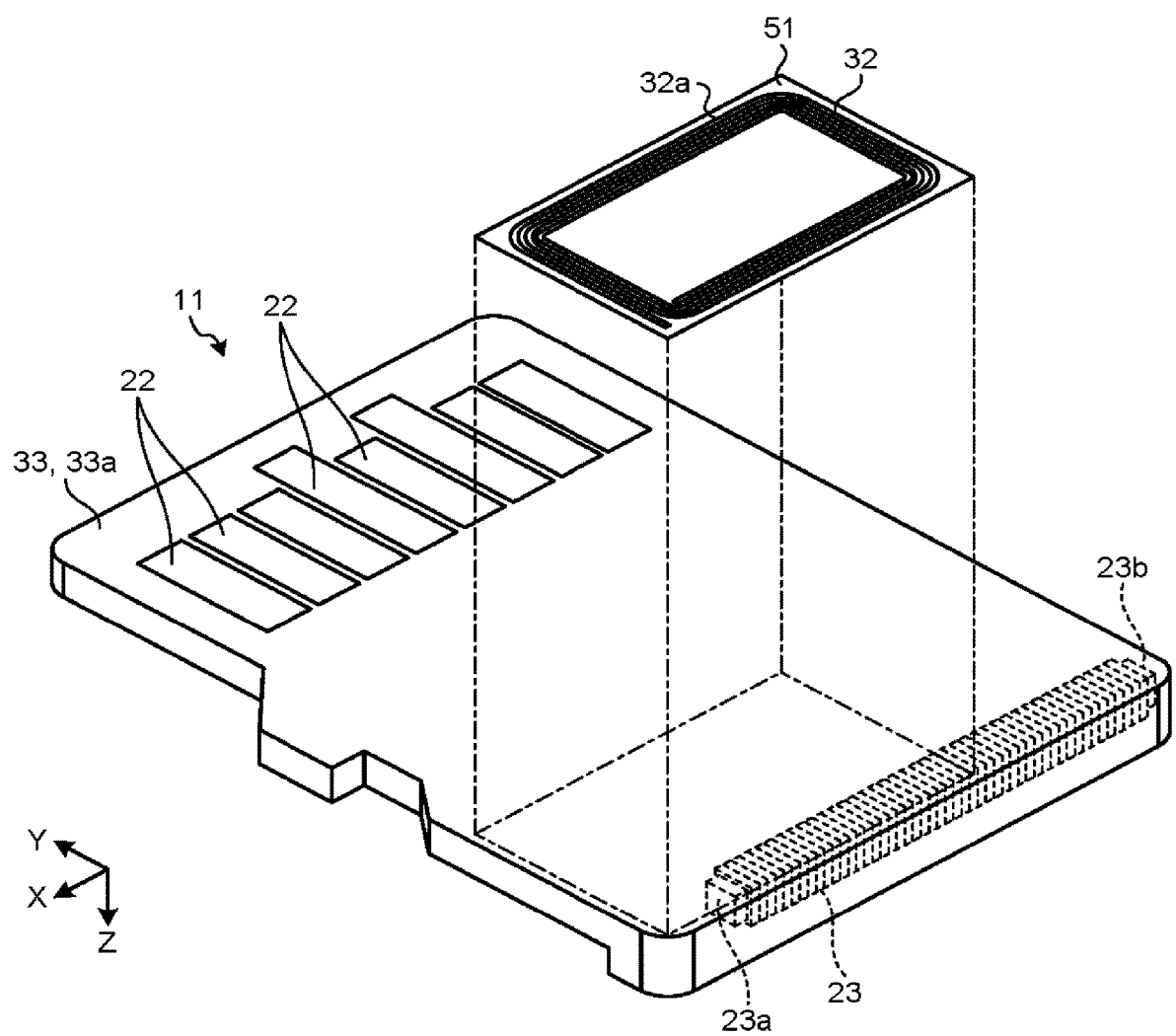
FIG. 5 is an exemplary perspective view schematically illustrating a memory card according to a second embodiment.

FIG. 5 is an exemplary perspective view schematically illustrating the memory card 11 according to the second embodiment. As illustrated in FIG. 5, in the second embodiment, the memory card 11 further includes a film 51. The film 51, for example, can also be referred to as a seal.

The film 51, for example, is made of a synthetic resin, and may be made of other materials such as paper. In the second embodiment, the intermediate antenna 32 is provided on the film 51. Further, the capacitor 49 of FIG. 2 is also provided on the film 51, and is connected to the terminal of the intermediate antenna 32.

The film 51, for example, is pasted to the first outer surface 33a of the cover 33 by an adhesive agent applied onto the film 51. Furthermore, the film 51 may be pasted to the first outer surface 33a by other means such as a double-faced tape.

In the memory card 11 of the second embodiment described above, the film 51 on which the intermediate antenna 32 is provided, is pasted to the first outer surface 33a on which the I/F terminal 22 is exposed. Accordingly, it is possible to easily provide the intermediate antenna 32. Further, a suitable distance is easily provided between the intermediate antenna 32 and the wireless antenna 23, and the magnetic flux of the second magnetic field M2, generated by the intermediate antenna 32, easily passes through the inside of the wireless antenna 23. Accordingly, the controller 24 is capable of more reliably communicating with the wireless communication host device 13, and thus, it is possible to increase the communication range of the semiconductor storage device.

Third Embodiment

Figure 6:
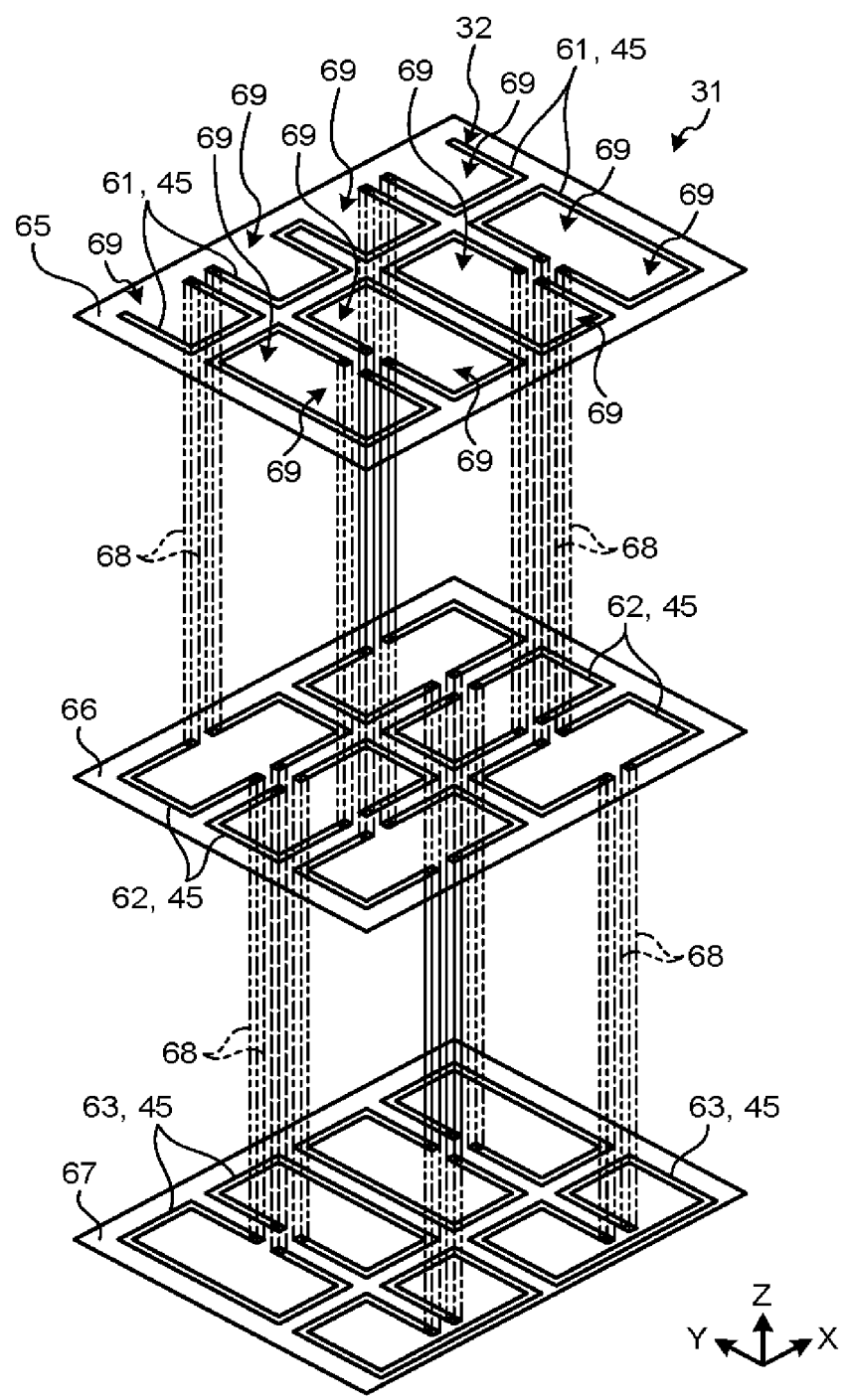
FIG. 6 is an exemplary perspective view schematically illustrating an intermediate antenna according to a third embodiment.

Hereinafter, a third embodiment will be described with reference to FIG. 6. FIG. 6 is an exemplary perspective view schematically illustrating the intermediate antenna 32 according to the third embodiment. As illustrated in FIG. 6, the intermediate antenna 32 includes a plurality of first portions 61, a plurality of second portions 62, and a plurality of third portions 63.

The first portion 61 is formed of the conductor pattern 45 provided on a first layer 65 of the substrate 31. The second portion 62 is formed of the conductor pattern 45 provided on a second layer 66 of the substrate 31. The third portion 63 is formed of the conductor pattern 45 provided on a third layer 67 of the substrate 31.

The second layer 66 is positioned between the first layer 65 and the third layer 67. Furthermore, other layers may be interposed between the first layer 65 and the second layer 66 or between the second layer 66 and the third layer 67. The plurality of second portions 62 are respectively electrically connected to the first portions 61 and the third portions 63, through a via 68.

The plurality of first portions 61, the plurality of second portions 62, and the plurality of third portions 63, connected to each other through the via 68, form a plurality of coils 69 connected in series. In other words, the intermediate antenna 32 includes the plurality of coils 69. The plurality of coils 69 are arranged into the shape of a matrix, on the X-Y plane. Furthermore, the arrangement of the plurality of coils 69 is not limited to such an example.

The plurality of coils 69 are respectively formed of the first portion 61, the second portion 62, and the third portion 63. The first portion 61, the second portion 62, and the third portion 63 are provided on the first layer 65, the second layer 66, and the third layer 67 of the substrate 31, and thus, the coil 69 is formed into the shape of a helix. Furthermore, the plurality of coils 69 may be formed into the shape of a spiral.

In a case where the magnetic flux of the first magnetic field M1 passes through the inside of at least one of the plurality of coils 69, the electromagnetic induction is generated in the intermediate antenna 32 including the plurality of coils 69. Accordingly, the plurality of coils 69 generate the second magnetic field M2.

In the memory card 11 of the third embodiment described above, the wireless antenna 23 includes the plurality of coils 69 connected in series. Accordingly, a space on the inside of the wireless antenna 23 decreases, compared to a case where the wireless antenna 23 formed of one large coil is provided on the intermediate layer of the substrate 31. For this reason, the generation of air bubbles on the substrate 31 is suppressed, and a decrease in a yield ratio of the memory card 11 is suppressed, on the inside of the wireless antenna 23.

Fourth Embodiment

Figure 7:
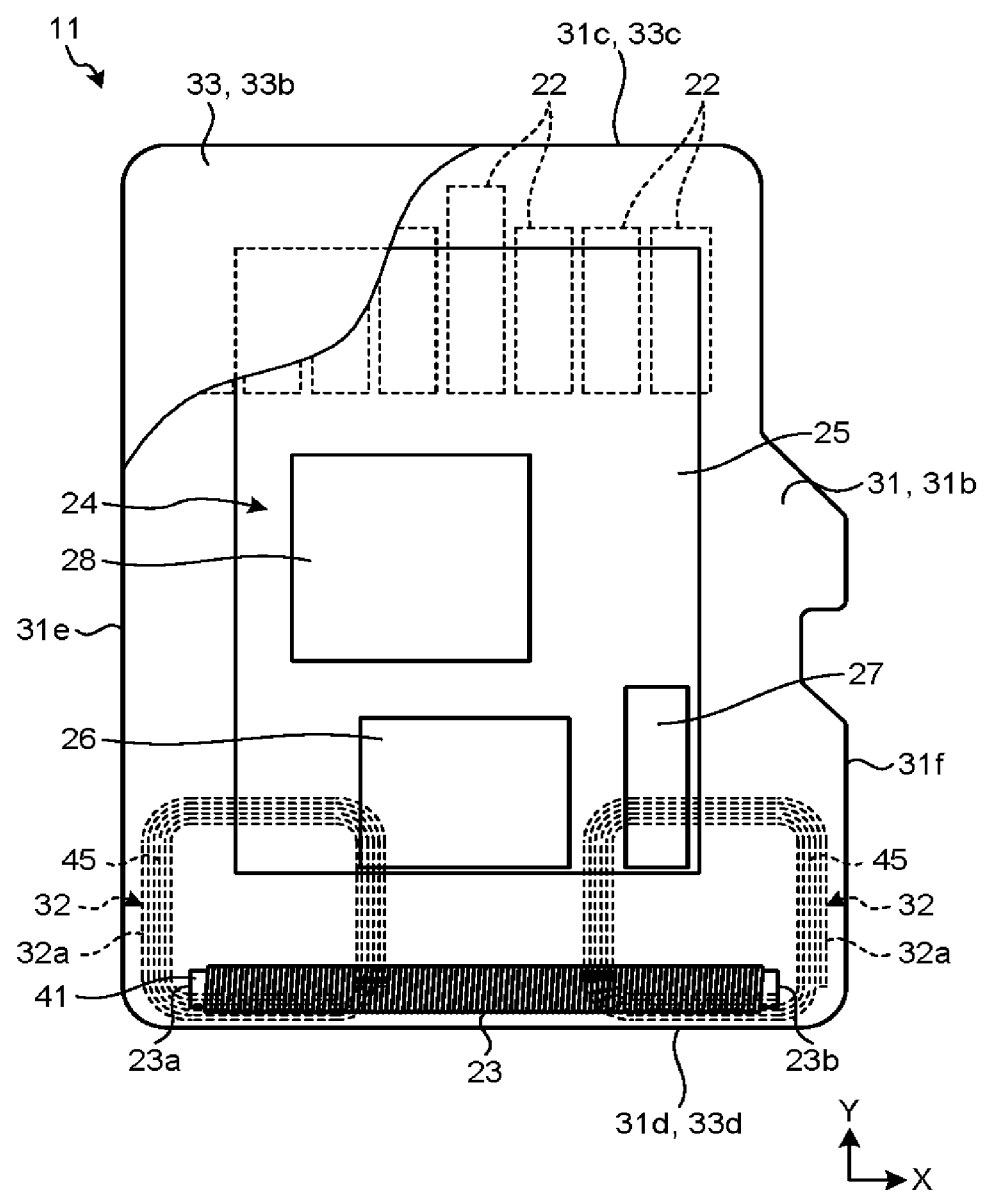
FIG. 7 is an exemplary plan view schematically illustrating a memory card according to a fourth embodiment.

Hereinafter, a fourth embodiment will be described with reference to FIG. 7. FIG. 7 is an exemplary plan view schematically illustrating the memory card 11 according to the fourth embodiment. As illustrated in FIG. 7, the memory card 11 of the fourth embodiment includes two intermediate antennas 32. The two intermediate antennas 32 are electrically separated from each other. The two intermediate antennas 32 each form another resonance circuit C2.

In the plan view seen in the Z axis direction, the one end portion 23a of the wireless antenna 23 is positioned on the inside of the outer edge 32a of the one intermediate antenna 32. The other end portion 23b of the wireless antenna 23 is positioned on the inside of the outer edge 32a of the other intermediate antenna 32.

The memory card 11 of the fourth embodiment described above, includes the two intermediate antennas 32 electrically separated from each other. In the plan view seen in the Z axis direction, the one end portion 23a of the wireless antenna 23 is positioned on the inside of the outer edge 32a of the one intermediate antenna 32, and the other end portion 23b is positioned on the inside of the outer edge 32a of the other intermediate antenna 32. Accordingly, in a case where the magnetic flux of the first magnetic field M1 passes through the inside of one in the two intermediate antennas 32, the electromagnetic induction can be generated on the inside of the wireless antenna 23. Accordingly, it is possible to increase the communication range of the memory card 11.

Fifth Embodiment

Figure 8:
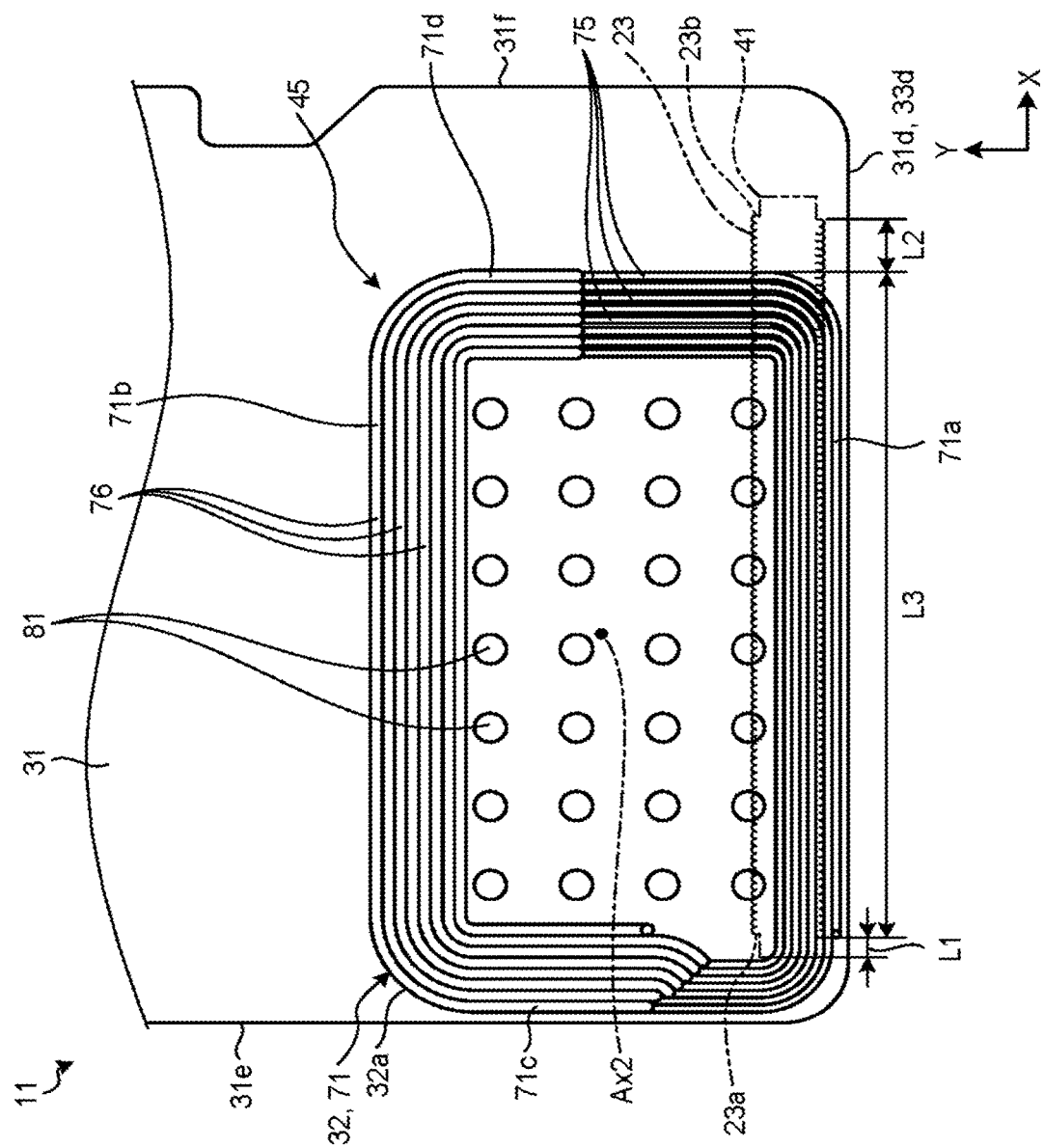
FIG. 8 is an exemplary plan view schematically illustrating a layer of a substrate, on which an intermediate antenna is provided, according to a fifth embodiment.

Hereinafter, a fifth embodiment will be described with reference to FIG. 8. FIG. 8 is an exemplary plan view schematically illustrating a layer of substrate 31, on which the intermediate antenna 32 is provided, according to the fifth embodiment. In FIG. 8, the wireless antenna 23 is represented by a dashed-two dotted line.

As illustrated in FIG. 8, the intermediate antenna 32 of the fifth embodiment is designed to be larger than the intermediate antenna 32 of the first embodiment. For example, the length of the intermediate antenna 32 in the X axis direction, is longer than the length of the wireless antenna 23 in the X axis direction. The intermediate antenna 32 is designed to be longer, and thus, the cross section on the inside of the intermediate antenna 32 increases, and the inductance of the intermediate antenna 32 increases. Accordingly, it is possible to increase the communication range of the memory card 11.

The intermediate antenna 32 includes a wire 71 formed of the conductor pattern 45. The wire 71 includes a first extension portion 71a, a second extension portion 71b, a third extension portion 71c, and a fourth extension portion 71d. The first extension portion 71a is an example of a part of the wire.

The first extension portion 71a is adjacent to the second edge 31d of the substrate 31 and the second edge 33d of the cover 33, and extends along the second edges 31d and 33d in the X axis direction. The second extension portion 71b is separated from the first extension portion 71a in the positive direction of the Y axis, and extends in the X axis direction.

The third extension portion 71c and the fourth extension portion 71d extend in the Y axis direction, between the first extension portion 71a and the second extension portion 71b. The third extension portion 71c is adjacent to the third edge 31e of the substrate 31, and extends along the third edge 31e. The fourth extension portion 71d is separated from the third extension portion 71c in the positive direction of the X axis (a direction represented by an arrow of the X axis). The intermediate antenna 32 including the first to fourth extension portions 71a, 71b, 71c, and 71d is formed approximately into the shape of a rectangular ring. Furthermore, the shape of the intermediate antenna 32 is not limited to such an example.

The wireless antenna 23 is positioned in the vicinity of the first extension portion 71a. In this embodiment, the wireless antenna 23 extends along the first extension portion 71a, and overlaps with a part of the first extension portion 71a, in the plan view seen in the direction in which the center Ax2 of the intermediate antenna 32 extends. Furthermore, the wireless antenna 23 may be separated from the first extension portion 71a, in the plan view seen in the direction in which the center Ax2 of the intermediate antenna 32 extends.

In the plan view seen in the direction in which the center Ax2 of the intermediate antenna 32 extends, the one end portion 23a of the wireless antenna 23 is positioned on the inside of the outer edge 32a of the intermediate antenna 32. Furthermore, a part of the end portion 23a may be positioned on the inside of the outer edge 32a, and another part of the end portion 23a may be positioned on the outside of the outer edge 32a. Further, in the plan view seen in the direction in which the center Ax2 of the intermediate antenna 32 extends, the other end portion 23b of the wireless antenna 23 is positioned on the outside of the outer edge 32a of the intermediate antenna 32.

A distance between the one end portion 23a of the wireless antenna 23 and the wire 71, is shorter than a distance between the other end portion 23b and the wire 71. For example, a distance L1 between the end portion 23a and the third extension portion 71c, is shorter than a distance L2 between the end portion 23b and the fourth extension portion 71d. Furthermore, the distances L1 and L2 are not limited to such an example.

In the plan view seen in the direction in which the center Ax2 of the intermediate antenna 32 extends, a length L3 of a part of the wireless antenna 23 overlapping with the first extension portion 71a, is shorter than the distance L2 between the end portion 23b of the wireless antenna 23 and the wire 71. Furthermore, the distance L2 and the length L3 are not limited to such an example.

The wire 71 includes a plurality of first wires 75 and a plurality of second wires 76. The second wire 76 is thicker than the first wire 75. The first wire 75 and the second wire 76 are alternately connected to each other, and form the spiral intermediate antenna 32.

The first extension portion 71a of the wire 71 is formed of the first wires 75. The second extension portion 71b is formed of the second wires 76. The third extension portion 71c and the fourth extension portion 71d are formed of the first wires 75 and the second wires 76, respectively.

The conductor pattern 45 forms not only the intermediate antenna 32, but also a plurality of dummy patterns 81. The dummy patterns 81 are arranged in a grid manner (a matrix) on the inside of the intermediate antenna 32, at intervals.

The plurality of dummy patterns 81 are electrically separated from each other, and are electrically separated from the circuit C1 and the resonance circuit C2 of FIG. 2. The dummy pattern 81, for example, may be electrically connected to other conductors such as another dummy pattern 81.

The dummy pattern 81, for example, is formed approximately into the shape of a circle. Furthermore, the dummy pattern 81 may be in other shapes. A distance between the adjacent dummy patterns 81, is longer than the diameter of the dummy pattern 81. For this reason, on the inside of the intermediate antenna 32, the density of the dummy pattern 81 is lower than the density of the non-magnetic body. The density of the dummy pattern 81 on the inside of the intermediate antenna 32, for example, is set according to communication performance of the intermediate antenna 32.

Providing the dummy pattern 81 suppresses the formation of the air bubbles on the substrate 31. Further, providing the dummy pattern 81 improves the strength of the substrate 31, and makes the first surface 31a and the second surface 31b of the substrate 31 more even.

In the memory card 11 of the fifth embodiment described above, the wireless antenna 23 is positioned in the vicinity of the wire 71 of the intermediate antenna 32. That is, the wireless antenna 23 is arranged in a position where a magnetic flux density of the second magnetic field M2, generated by the intermediate antenna 32, is high. Accordingly, the induced electromotive force generated by the wireless antenna 23, increases, and thus, it is possible to increase the communication range of the memory card 11.

The wireless antenna 23 extends along the first extension portion 71a of the wire 71, and overlaps with the first extension portion 71a, in the plan view seen in the direction in which the center Ax2 of the intermediate antenna 32 extends. That is, the wireless antenna 23 is arranged in the position where the magnetic flux density of the second magnetic field M2, generated by the intermediate antenna 32, is high. Accordingly, the induced electromotive force generated by the wireless antenna 23, increases, and thus, it is possible to increase the communication range of the memory card 11.

The magnetic flux of the second magnetic field M2, generated in the vicinity of the wire 71, is capable of entering the inside of the wireless antenna 23 from a gap of a winding wire of the wireless antenna 23. Further, the magnetic body 41 makes the magnetic flux of the second magnetic field M2 easily enter the inside of the wireless antenna 23. For this reason, the magnetic flux of the second magnetic field M2, generated in the vicinity of the first extension portion 71a, generates the induced electromotive force in the wireless antenna 23, on the basis of the electromagnetic induction. The magnetic flux density of the second magnetic field M2 increases as becoming closer to wire 71, and thus, more magnetic flux of the second magnetic field M2 is capable of entering the gap of the winding wire of the wireless antenna 23 arranged in the vicinity of the wire 71. Accordingly, the wireless antenna 23 of this embodiment, overlapping with the first extension portion 71a, is capable of generating a larger induced electromotive force.

In the plan view seen in the direction in which the center Ax2 of the intermediate antenna 32 extends, at least a part of the end portion 23a of the wireless antenna 23 is positioned on the inside of the outer edge 32a of the intermediate antenna 32, and the end portion 23b is positioned on the outside of the outer edge 32a of the intermediate antenna 32. Accordingly, the magnetic flux of the second magnetic field M2, entering the end portion 23a, further increases, and the magnetic flux of the second magnetic field M2, entering the end portion 23b, further decreases. Accordingly, in the wireless antenna 23, the induced electromotive force according to the magnetic flux entering from the end portion 23a, and the induced electromotive force according to the magnetic flux entering from the end portion 23b, are prevented from canceling each other. According to a decrease in the induced electromotive force to be canceled, the induced electromotive force for operating the controller 24, generated in the wireless antenna 23, increases, and thus, it is possible to increase the communication range of the memory card 11.

The distance L1 between the end portion 23a and the wire 71, is shorter than the distance L2 between the end portion 23b and the wire 71. Accordingly, the magnetic flux of the second magnetic field M2, entering the end portion 23a, further increases, and the magnetic flux of the second magnetic field M2, entering the end portion 23b, further decreases. Accordingly, in the wireless antenna 23, the induced electromotive force according to the magnetic flux entering from the end portion 23a, and the induced electromotive force according to the magnetic flux entering from the end portion 23b, are prevented from canceling each other. According to a decrease in the induced electromotive force to be canceled, the induced electromotive force for operating the controller 24, generated in the wireless antenna 23, increases, and thus, it is possible to increase the communication range of the memory card 11.

In the plan view seen in the direction in which the center Ax2 of the intermediate antenna 32 extends, the length L3 of a part of the wireless antenna 23, overlapping with the first extension portion 71a, is longer than the distance L2 between the end portion 23b and the wire 71. Accordingly, more parts of the wireless antenna 23 are arranged in a position where the magnetic flux density of the second magnetic field M2 increases. Accordingly, the induced electromotive force generated by the wireless antenna 23, increases, and thus, it is possible to increase the communication range of the memory card 11.

The wire 71 includes the first wire 75, and the second wire 76 thicker than the first wire 75. Accordingly, electrical resistance of the second wire 76 is reduced, and thus, it is possible to increase the communication range of the memory card 11. Further, it is possible to increase the cross section on the inside of the intermediate antenna 32 and the inductance by the first wire 75, and it is possible to increase the communication range of the memory card 11.

Sixth Embodiment

Hereinafter, a sixth embodiment will be described with reference to FIG. 9. FIG. 9 is an exemplary plan view schematically illustrating a layer of the substrate 31, on which the intermediate antenna 32 is provided, according to the sixth embodiment. As illustrated in FIG. 9, the wire 71 of the sixth embodiment includes a concave portion 71e.

The concave portion 71e is a part of the wire 71 recessed towards the inside of the intermediate antenna 32. The concave portion 71e is provided on the corner between the first extension portion 71a and the fourth extension portion 71d. For this reason, the length of each of the first extension portion 71a and the fourth extension portion 71d, is shorter than the length of each of the first extension portion 71a and the fourth extension portion 71d in the fifth embodiment.

In the plan view seen in the direction in which the center Ax2 of the intermediate antenna 32 extends, at least a part of the wireless antenna 23 intersects with the concave portion 71e. According to another expression, in the plan view seen in the direction in which the center Ax2 of the intermediate antenna 32 extends, the wireless antenna 23 extends across the concave portion 71e.

A region R is formed by the concave portion 71e. The region R is a part of the substrate 31, that is on the outside of the outer edge 32a of the intermediate antenna 32, and is surrounded by the concave portion 71e. FIG. 9 virtually illustrates the region R by a dashed-two dotted line.

The end portion 23b of the wireless antenna 23 is positioned on the region R. Accordingly, the distance L2 between the end portion 23b and the wire 71, can be longer than the distance L2 of the fifth embodiment. The wireless antenna 23 may pass through the region R and the end portion 23b may be positioned on the outside of the region R to increase the distance L2.

The length of the wireless antenna 23 and the length of the intermediate antenna 32 in the X axis direction of this embodiment, are identical to the length of the wireless antenna 23 and the length of the intermediate antenna 32 in the X axis direction of the fifth embodiment. However, the distance L2 is set to be longer by the concave portion 71e of the wire 71.

In the memory card 11 of the sixth embodiment described above, the wire 71 includes the concave portion 71e recessed towards the inside of the intermediate antenna 32. In the plan view seen in the direction in which the center Ax2 of the intermediate antenna 32 extends, at least a part of the wireless antenna 23 intersects with the concave portion 71e. For this reason, the end portion 23b can be arranged on the region R formed by the concave portion 71e, or the wireless antenna 23 is capable of passing through the region R and the end portion 23b can be arranged in a position separated from the wire 71. Accordingly, for example, even in a case where there is a restriction on an area for wiring and mounting, in the memory card 11, it is possible to arrange the end portion 23b on the outside of the outer edge 32a of the intermediate antenna 32. In addition, the concave portion 71e decreases the cross section on the inside of the intermediate antenna 32, but other parts of the wire 71 can be arranged to increase the cross section on the inside of the intermediate antenna 32. Accordingly, the cross section on the inside of the intermediate antenna 32 and the inductance increase, and thus, it is possible to increase the communication range of the memory card 11.

In the first, second, fourth, fifth, and sixth embodiments, the intermediate antenna 32 is provided on one layer. However, the intermediate antenna 32 may be provided on a plurality of layers. Accordingly, for example, even in a case where there is a restriction on an area for wiring and mounting, in the memory card 11, it is possible to increase the number of windings of the intermediate antenna 32, and a decrease in the cross section on the inside of the intermediate antenna 32, is suppressed. Accordingly, it is possible to increase the communication range of the memory card 11.

In the plurality of embodiments described above, the wireless antenna 23 is a chip antenna, and the intermediate antenna 32 is formed of the conductor pattern 45 of the substrate 31. However, the wireless antenna 23 may be formed of the conductor pattern 45 provided on the substrate 31, as with the intermediate antenna 32. In addition, the intermediate antenna 32 may be a chip antenna mounted on the substrate 31, as with the wireless antenna 23. In such a case, the wireless communication controller 26 is capable of communicating with the wireless communication host device 13 in both of a case where the magnetic flux of the first magnetic field M1 directly passes through the inside of the wireless antenna 23, and a case where the magnetic flux of the first magnetic field M1 passes through the inside of the intermediate antenna 32, and thus, the intermediate antenna 32 generates the second magnetic field M2, and the magnetic flux of the second magnetic field M2 passes through the inside of the wireless antenna 23. Accordingly, it is possible to increase the communication range of the memory card 11, compared to a case where the intermediate antenna 32 is absent.

According to at least one of the embodiments described above, the first loop antenna generates the second magnetic field on the basis of the electromagnetic induction according to the first magnetic field. The second loop antenna generates the induced electromotive force on the basis of the electromagnetic induction according to the second magnetic field. The controller is operable on the basis of the induced electromotive force generated in the second loop antenna, and communicates with the first external device through the second loop antenna. That is, the first loop antenna translates the first magnetic field into the second magnetic field suitable for the electromagnetic induction of the second loop antenna. Accordingly, it is possible to increase the communication range of the semiconductor storage device, compared to a case where the first loop antenna is absent.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor storage device, comprising:
    a first loop antenna that generates a second magnetic field on the basis of electromagnetic induction according to a first magnetic field generated by a first external device;
    a second loop antenna that generates an induced electromotive force on the basis of electromagnetic induction according to the second magnetic field; and
    a controller that is operable on the basis of the induced electromotive force generated in the second loop antenna, and performs communication with respect to the first external device generating the first magnetic field, through the second loop antenna.
2. The semiconductor storage device according to claim 1, wherein the second loop antenna is capable of generating an induced electromotive force on the basis of electromagnetic induction according to the first magnetic field.
3. The semiconductor storage device according to claim 1, wherein a first direction along a magnetic flux having the largest magnitude of a magnetic field generated by the first loop antenna and a second direction along a magnetic flux having the largest magnitude of a magnetic field generated by the second loop antenna are not parallel to each other.
4. The semiconductor storage device according to claim 3, wherein one end portion of the second loop antenna is positioned on the inside of an outer edge of the first loop antenna, in a plan view seen in the first direction.
5. The semiconductor storage device according to claim 1, wherein a cross section on the inside of the first loop antenna, orthogonal to the first direction along a magnetic flux having the largest maanitude of a magnetic field generated by the first loop antenna, is larger than a cross section on the inside of the second loop antenna, orthogonal to the second direction along a magnetic flux having the largest magnitude of a magnetic field generated by the second loop antenna.
6. The semiconductor storage device according to claim 1, wherein the first loop antenna and the second loop antenna are electrically separated from each other.
7. The semiconductor storage device according to claim 1, further comprising:
    a cover that includes an outer surface, and covers the controller; and
    a plurality of terminals that are exposed on the outer surface,
    wherein the controller performs communication with respect to a second external device through the terminal, and
    the first loop antenna is positioned between the second loop antenna and the outer surface.
8. The semiconductor storage device according to claim 1, further comprising:
    a substrate that is provided with a conductor pattern,
    wherein the controller is mounted on the substrate, and
    the conductor pattern forms the first loop antenna.
9. The semiconductor storage device according to claim 8, wherein the first loop antenna includes a plurality of coils connected in series.
10. The semiconductor storage device according to claim 8, wherein the second loop antenna is mounted on the substrate.
11. The semiconductor storage device according to claim 1, further comprising:
    a cover that includes an outer surface, and covers the controller;
    a plurality of terminals that are exposed on the outer surface; and
    a film that is provided with the first loop antenna,
    wherein the controller performs communication with respect to a second external device through the terminal, and
    the film is pasted to the outer surface.

12. The semiconductor storage device according to claim 1,
wherein a resonance frequency of the first loop antenna is greater than or equal to 10 MHz and less than or equal to 20 MHz.

13. The semiconductor storage device according to claim 1,
wherein the second loop antenna is positioned in the vicinity of a wire of the first loop antenna.

14. The semiconductor storage device according to claim 13,
wherein the second loop antenna extends along a part of the wire, and overlaps with the part of the wire, in the plan view seen in the first direction along a magnetic flux having the largest magnitude of a magnetic field generated by the first loop antenna.

15. The semiconductor storage device according to claim 14,
wherein the second loop antenna includes a first end portion, and a second end portion on a side opposite to the first end portion, and
at least a part of the first end portion is positioned on the inside of the outer edge of the first loop antenna, and the second end portion is positioned on the outside of the outer edge of the first loop antenna, in the plan view seen in the first direction.

16. The semiconductor storage device according to claim 15,
wherein a distance between the first end portion and the wire, is shorter than a distance between the second end portion and the wire.

17. The semiconductor storage device according to claim 15,
wherein a length of a part of the second loop antenna overlapping with the part of the wire, in the plan view seen in the first direction, is longer than a distance between the second end portion and the wire.

18. The semiconductor storage device according to claim 15,
wherein the wire includes a concave portion recessed towards the inside of the first loop antenna, and
at least a part of the second loop antenna intersects with the concave portion, in the plan view seen in the first direction.

19. The semiconductor storage device according to claim 13,
wherein the wire includes a first wire, and a second wire thicker than the first wire.

20. A semiconductor storage device, comprising:
a cover that includes an outer surface, a first edge, and a second edge positioned on a side opposite to the first edge;
a plurality of terminals that are exposed on the outer surface, and are arranged along the first edge;
a first loop antenna;
a second loop antenna that extends along the second edge; and
a controller that is covered with the cover, performs communication with respect to a first external device through the second loop antenna, and performs communication with respect to a second external device through the terminal,
wherein a first direction along a magnetic flux having the largest magnitude of a magnetic field generated by the first loop antenna and a second direction along a magnetic flux having the largest magnitude of a magnetic field generated by the second loop antenna are not parallel to each other,
the first loop antenna is positioned between the second loop antenna and the outer surface, and
one end portion of the second loop antenna is positioned on the inside of the outer edge of the first loop antenna, in the plan view seen in the first direction.

* * * * *